UNITED STATES PATENT OFFICE.

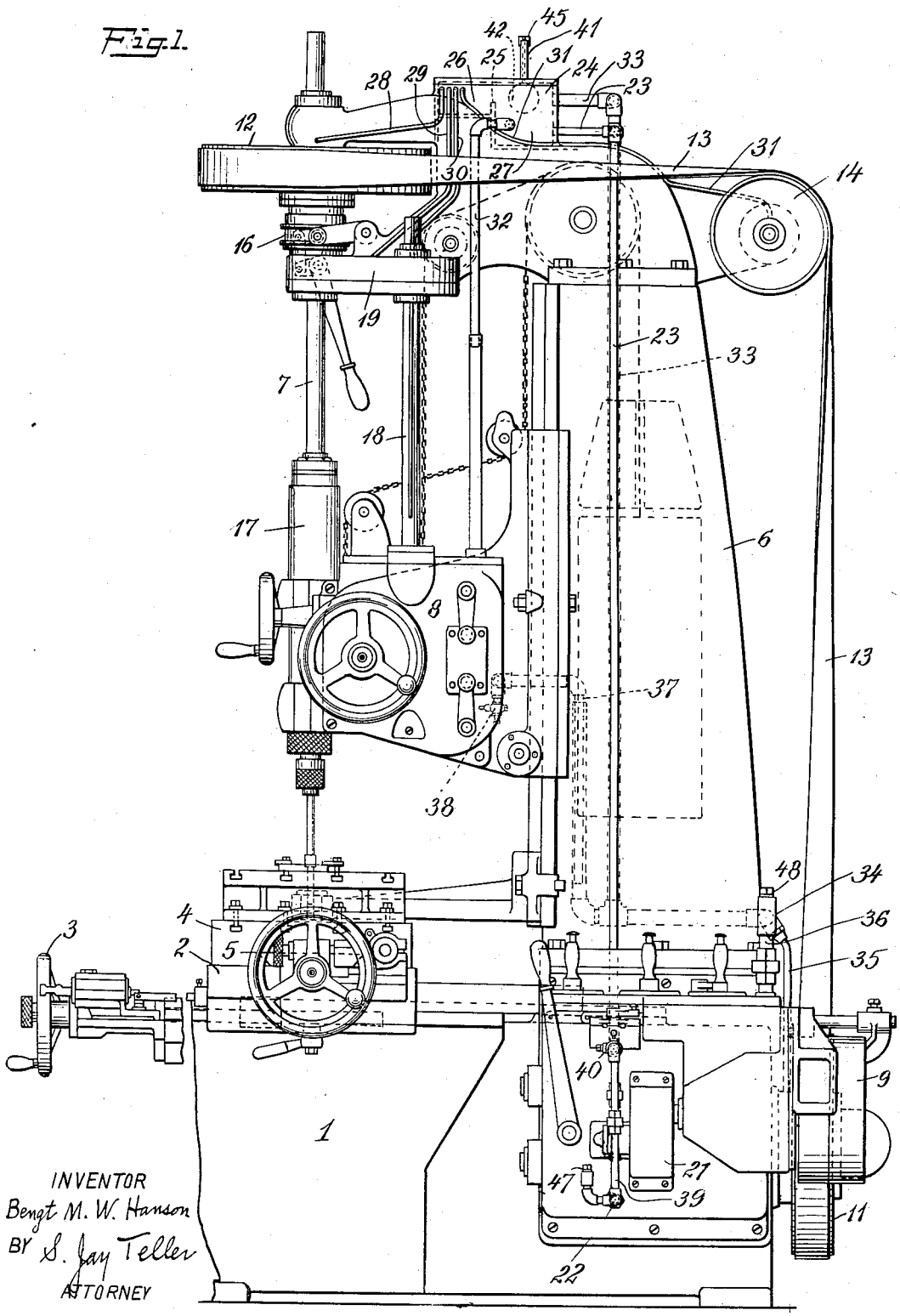

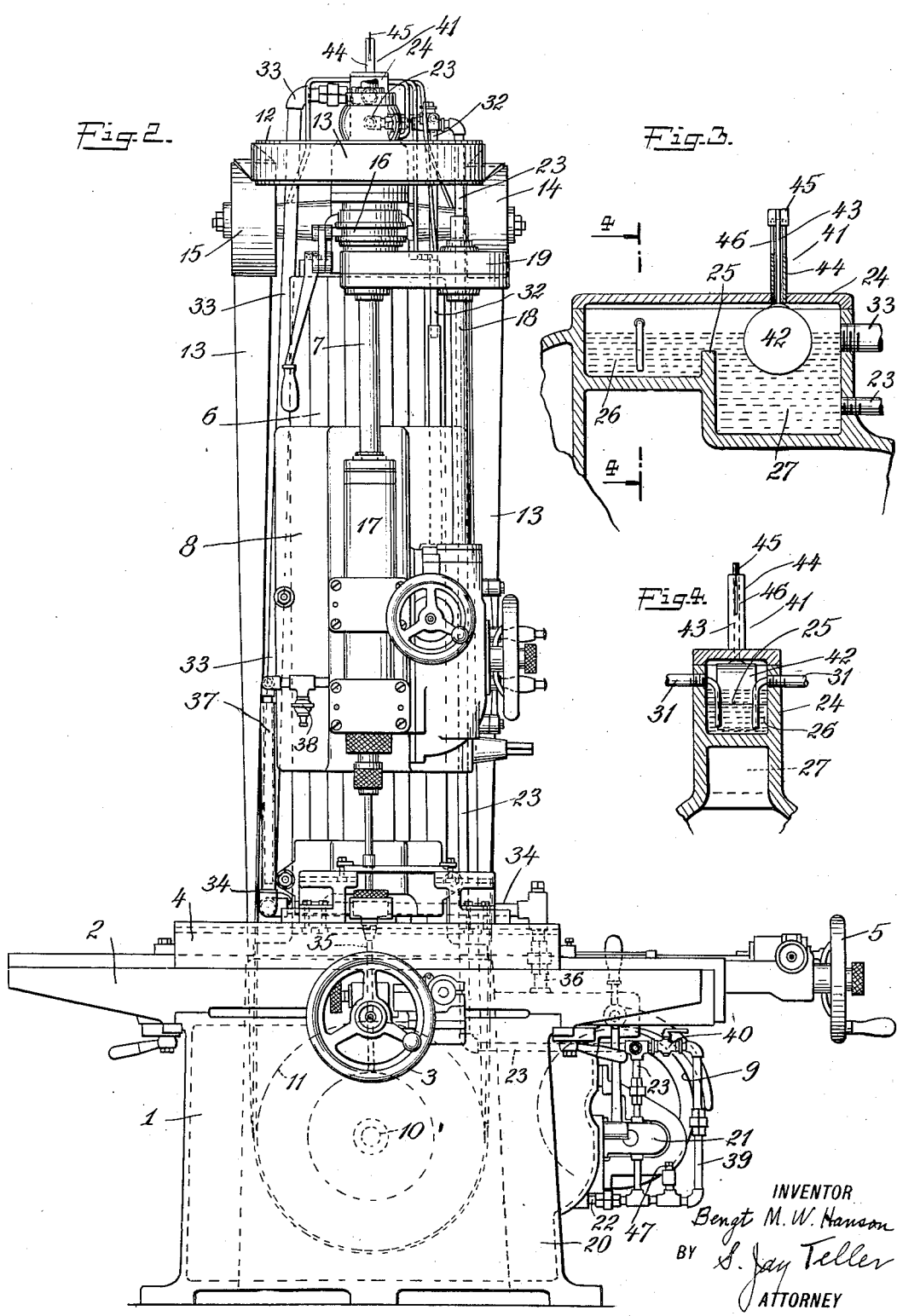

BENGT M. W. HANSON, OF HARTFORD, CONNECTICUT, ASSIGNOR TO PRATT & WHITNEY COMPANY, OF NEW YORK, N. Y., A CORPORATION OF NEW JERSEY.

LUBRICATING SYSTEM.

1,323,268.  Specification of Letters Patent.  Patented Dec. 2, 1919.

Application filed August 15, 1917, Serial No. 186,297. Renewed June 30, 1919. Serial No. 307,782.

*To all whom it may concern:*

Be it known that I, BENGT M. W. HANSON, a citizen of the United States, residing at Hartford, in the county of Hartford and State of Connecticut, have invented certain new and useful Improvements in Lubricating Systems, of which the following is a specification.

A lubricating system embodying the invention is well adapted for use in connection with certain types of machine tools, but it will be understood that the invention is not limited to machines of any particular class.

One of the objects of the invention is to provide a lubricating system having two associated reservoirs from each of which oil is led to lubricate certain of the machine bearings. Another object of the invention is to provide means whereby the operator can control the flow of oil to the reservoirs and whereby he is automatically informed when the reservoirs are full. Another object of the invention is to provide, in a system of the class set forth, a secondary reservoir which is vertically movable with respect to the primary reservoir. Other objects of the invention will be apparent from the following specification and claims.

In the accompanying drawings I have illustrated my invention as applied to a vertical boring and drilling machine such as set forth in my copending application for precision boring machines, Ser. No. 179,412, filed July 9, 1917, but it will be understood that a machine of this type is selected merely for purposes of illustration. The lubricating system can be varied widely in accordance with the requirements of the machine to which it is applied and the drawings are not to be construed as defining or limiting the scope of the invention, the accompanying claims being relied upon for that purpose.

Of the drawings:

Figure 1 is a side elevation of a machine having a lubricating system embodying the invention.

Fig. 2 is a front elevation of the machine shown in Fig. 1.

Fig. 3 is an enlarged sectional detail view showing the upper oil reservoir.

Fig. 4 is a fragmentary sectional view along the line 4—4 of Fig. 3.

The boring and drilling machine illustrated comprises a base 1 upon which is mounted a table 2 adapted to be moved transversely under the control of a screw which carries a hand wheel 3. Mounted for longitudinal movement along the table 2 is a carriage 4, this being adapted to be controlled by a screw which carries a hand wheel 5. Projecting upward from the bed 1 is a column 6 which carries bearings for a spindle 7. Vertically slidable along suitable ways on the column 6 is a head 8.

Power is applied to the machine by means of a belt engaging a belt pulley 9, and through suitable intermediate gearing in the base is transmitted to a shaft 10 which carries a belt pulley 11. Mounted on the spindle 7 and preferably rotatable independently thereof is a belt pulley 12. A belt 13 passes over the pulley 12 and also over the aforesaid pulley 11, being guided by suitable idler pulleys 14 and 15. By means of a clutch 16, having one element splined to the spindle 7, the spindle 7 may be connected with or disconnected from the pulley 12. Secured to the spindle 7 is a suitable metal cutting tool which is here shown as a boring bar. It will be seen that by opening or closing the clutch 16 the boring bar may be stopped or started as desired.

For feeding the cutting tool suitable gearing is provided in the head 8, this gearing engaging a sleeve 17 which surrounds the spindle 7. The gearing in the head 8 is driven by means of a vertical shaft 18 which receives its power from the spindle 7 by means of suitable gearing in the gear box 19. The shaft 18 has a splined connection with the last said gearing in order that the shaft may be moved vertically in the head 8.

The work to be machined is properly secured to the carriage 4 and is adjusted to proper position by means of the screws controlled by the hand wheels 3 and 5. The spindle 7 carrying the tool can be connected with the constantly rotated pulley 12 by means of the clutch, and the spindle can be fed downward to bring the tool into operative engagement with the work by means of the aforesaid gearing in the head 8.

The parts thus far described do not of themselves constitute any part of my present invention and have been shown and described merely in order that there may be a clear understanding of the lubricating system which will now be set forth in detail.

Formed in the lower part of the base 1 is an oil sump 20 which is normally filled with lubricating oil. An oil pump 21 is provided and is operatively connected with the drive mechanism. The pump is adapted to withdraw oil from the sump through a pipe 22 and to deliver the oil through a pipe 23 which extends to a point at or near the top of the machine. The pipe 23 communicates with an oil reservoir 24.

As shown in Fig. 1, the reservoir 24 is divided by means of a partition 25 into two compartments 26 and 27. Communicating with the compartment 26 are oil pipes 28 to 31 which extend respectively to the bearings for the spindle 7, for the gearing in the box 19, for the vertical shaft 18 and for the idler pulleys 14 and 15. Oil is fed to these pipes from the compartment 26 by means of wicks in the well known manner.

A pipe 32 extends from the compartment 27 to the head 8, this pipe preferably having two telescoping sections as shown in Fig. 1 so as to permit the vertical movement of the head. The head is constructed to hold the oil thus supplied and constitutes a secondary reservoir.

Extending from the reservoir 24 near the top thereof is a pipe 33 which communicates with a pipe 34. This pipe 34 has branches 35 and 36 which extend respectively to the bearings for the shaft 10 and for the drive gearing through which power is transmitted from the belt pulley 9. Extending from the head 8 is a pipe 37 which also joins the aforesaid pipe 34. This pipe 37 preferably has two telescoping sections which permit the head 8 to be moved upward or downward. There is provided a pet cock 38 in the pipe 37 adjacent the head.

When the pump 21 is in operation it serves to withdraw oil from the sump 20 and to supply it to the reservoir 24. From the section 26 of the reservoir 24 oil is supplied by wicks to the pipes 28, 29, 30 and 31 and flows slowly as required to the several bearings already referred to. From the section 27 of the reservoir 24 the oil flows rapidly through the pipe 32 into the head 8 where it serves to lubricate the feed gearing. Surplus oil in the reservoir 24 overflows through the pipe 33 and into the pipes 35 and 36, thus lubricating the bearings in the lower part of the base. It is also possible for oil to flow from the head 8 through the pipe 37 to lubricate the bearings in the lower part of the base.

The circulation of oil may be maintained continuously by means of a pump as described. I prefer, however, to provide means whereby the reservoir 24 and the head 8 may be fed intermittently at suitable intervals, the flow of oil through the supply pipe 23 being discontinued at other times. With this end in view I have provided means for interrupting effective operation of the pump 21. I do not limit myself to any particular means for this purpose, but, as shown, there is a by-pass connection 39 which extends from the intake side of the pump to the discharge side and is provided with a valve 40. When the valve is closed oil flows through the pipe 23 in the way already described. By opening the valve 40 the oil is permitted to follow the path of least resistance and to flow through the by-pass instead of through the pipe 23.

In order that the oil may be supplied at intervals without danger of flooding the machine, I provide an automatic device 41 for indicating the level of the oil in the reservoir 24. This indicator may be of any one of a number of forms but I have shown an indicator of the float type. As shown in Figs. 3 and 4, there is a float 42 carrying a stem 43 which projects upward through a pipe 44 secured to the cover of the reservoir. At the upper end of the stem is a plate 45 which is positioned in a slot 46 in the pipe 44 when the float 42 is in its lower position. When the oil level rises the float moves upward and carries the plate 45 out of the pipe, thus indicating to the operator that the reservoir is full.

In practice, the operator may leave the valve 40 normally open but close it at suitable intervals to cause oil to the full capacity of the pump to flow through the pipe 23. The oil entering the reservoir immediately begins to flow out through the pipe 32 and to fill the head 8. Eventually, however, the reservoir 24 is filled and any surplus oil flows out through the pipe 33. As soon as the indicator 41 shows that the reservoir is full the operator opens the valve 40, thus discontinuing the supply of oil. The oil in the section 26 of the reservoir is retained to supply the pipes 28, 29, 30 and 31; but the oil in the section 27 of the reservoir flows out relatively quickly into the head where it is retained to lubricate the gearing therein. From the foregoing description it will be clear that the pipe 33 together with the pipes 34, 35 and 36 will be filled with oil which is available to lubricate the bearings in the lower part of the base; but in addition oil from the head 8 is supplied to the pipe 37 to also lubricate these bearings. From these last said bearings the oil is returned to the sump.

If preferred, however, the operator may close the valve 40, or preferably turn it to an intermediate position, thus causing oil to flow continuously through the pipe 23 to be distributed in the manner already set forth.

At 47 there is provided an opening, normally closed by a plug, through which fresh oil can be supplied to the system, this oil flowing initially into the sump. Preferably, in introducing a fresh supply of oil, the sump is filled and then the pump is used to circulate the oil until it begins to flow out of the pet cock 38 which is left open; then the pet cock is closed and additional oil is supplied to the sump through the opening at 47.

The pet cock 38 is also useful to enable the operator to determine from time to time whether the oil is flowing properly. For this same purpose there is preferably provided an opening at 48 which is normally closed by a plug.

What I claim is:

1. In a lubricating system, the combination with a machine having bearings, of an oil sump at a level below the bearings, a primary reservoir at a level above the bearings, a pump for moving oil from the sump to the reservoir, a secondary reservoir at a level between that of the sump and that of the primary reservoir, a pipe for leading oil by gravity from the primary reservoir to the secondary reservoir, pipes for distributing oil from the secondary reservoir to some of the bearings from which it is returned to the sump, means for starting and stopping the effective action of the pump, and means for indicating the level of oil in the primary reservoir, thus enabling the operator to stop the flow of oil from the pump when the two reservoirs are full.

2. In a lubricating system, the combination with a machine having bearings, of an oil sump at a level below the bearings, a primary reservoir at a level above the bearings, a pump for moving oil from the sump to the reservoir, a vertically movable secondary reservoir located between the level of the sump and the level of the primary reservoir, a telescoping pipe for leading oil by gravity from the primary reservoir to the secondary reservoir, and a telescoping pipe for leading oil from the secondary reservoir to some of the bearings from which it is returned to the sump.

3. In a lubricating system, the combination with a machine having bearings, of an oil sump at a level below the bearings, a primary reservoir at a level above the bearings, a pump for moving oil from the sump to the reservoir, a secondary reservoir at a level between that of the sump and that of the primary reservoir, a pipe for leading oil by gravity from the primary reservoir to the secondary reservoir, pipes for distributing oil from the secondary reservoir to some of the bearings from which it is returned to the sump, and an overflow pipe extending from the primary reservoir and connecting with the last said pipes.

4. In a lubricating system, the combination with a machine having bearings, of an oil sump at a level below the bearings, a two-part primary reservoir at a level above the bearings, a pump for moving oil from the sump to the reservoir, pipes for distributing oil from one part of the primary reservoir to some of the upper bearings, a secondary reservoir at a level between that of the sump and that of the primary reservoir, a pipe for leading oil by gravity from the other part of the primary reservoir to the secondary reservoir, and a pipe for distributing oil from the secondary reservoir to some of the lower bearings from which it is returned to the sump.

In testimony whereof, I hereto affix my signature.

BENGT M. W. HANSON.